United States Patent
Seese et al.

(10) Patent No.: US 6,466,934 B2
(45) Date of Patent: Oct. 15, 2002

(54) EXTERNAL SYSTEM INTERFACE METHOD AND SYSTEM

(75) Inventors: David John Seese, Houston, TX (US); Darcy Wellington Phillips, Mableton, GA (US); Lee Yeh Tan, Katy, TX (US); Rakesh Burudgunte; Eric Peter Rodriguez, both of Houston, TX (US)

(73) Assignee: Junot Systems, Inc., Houston, TX (US)

(*) Notice: Subject to any disclaimer, the term of this patent is extended or adjusted under 35 U.S.C. 154(b) by 0 days.

(21) Appl. No.: 09/853,229

(22) Filed: May 11, 2001

(65) Prior Publication Data

US 2001/0032206 A1 Oct. 18, 2001

Related U.S. Application Data

(62) Division of application No. 09/350,621, filed on Jul. 9, 1999.

(51) Int. Cl.[7] .................... G06F 17/30
(52) U.S. Cl. .......... 707/4; 707/2; 707/3; 707/10; 707/102; 707/103; 707/104
(58) Field of Search ............ 707/4, 2, 3, 104, 707/102, 103, 8, 10, 201; 379/207.12, 246; 705/10; 709/217, 219, 315; 711/118, 117

(56) References Cited

U.S. PATENT DOCUMENTS

| | | |
|---|---|---|
| 4,939,668 A | 7/1990 | Brown et al. |
| 5,121,497 A | 6/1992 | Kerr et al. |
| 5,142,469 A | 8/1992 | Weisenborn |
| 5,142,681 A | 8/1992 | Driscoll et al. |
| 5,159,687 A | 10/1992 | Richburg |
| 5,787,300 A | 7/1998 | Wijaya |
| 5,842,205 A | 11/1998 | Brann |
| 5,862,325 A | 1/1999 | Reed et al. |
| 5,918,232 A | 6/1999 | Pouschine et al. |
| 5,995,972 A | 11/1999 | Allgeier |

*Primary Examiner*—Jean M. Corrielus
(74) *Attorney, Agent, or Firm*—Arnold & Associates; Gordon Arnold

(57) ABSTRACT

This invention relates to the field of interfaces between systems having data needs such as databases and input devices. Specific examples include SAP systems and barcode readers. In general, these systems are referred to as "external systems." A need exists for a method and system for providing an interface between external systems, such that the user of the external systems can configure an interface based solely on knowledge of the data in the external systems, without a need to have an in-depth understanding of the database model and communication protocols of each of the external systems. Therefore, according to one aspect of the invention, in an interface for communication with a first external system and a second external system, a method is provided for responding to an event, the event being related to communication with at least one of the first or the second external systems, the method comprising: receiving a message, the message comprising a metadata event key and a session identifier, the session identifier identifying a workset database for use with the message, the workset database having a workset database structure dependent upon metadata; and processing an action series dependent upon the metadata event key, wherein said processing is assigned to the session.

18 Claims, 10 Drawing Sheets

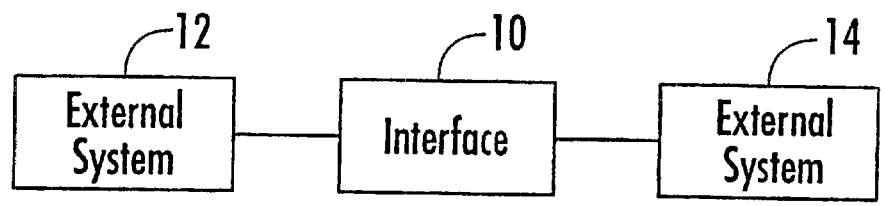
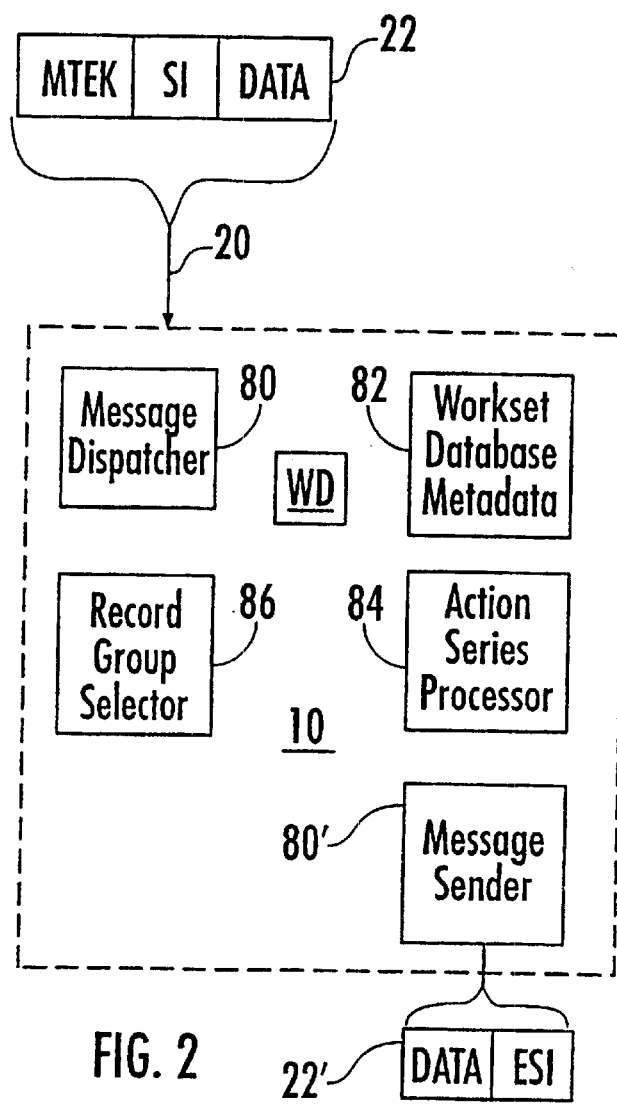
FIG. 1
FIG. 2

EXTERNAL SYSTEM INTERFACE METHOD AND SYSTEM

This application is a division of application Ser. No. 09/350,621, filed Jul. 9, 1999; status pending.

BACKGROUND OF THE INVENTION

This invention relates to the field of interfaces between systems having data needs such as databases and input devices. Specific examples include SAP™ systems and bar-code readers. In general, these systems are referred to as "external systems."

Referring now to FIG. 1, an interface 10 for communication with a first external system 12 and a second external system 14 is seen. External system 12 comprises a database of information housed, for example, on a "SAP R/3™" system or any "SAP" system. External system 12 comprises a data entry system (for example, a bar code reader). Other examples of external system 12 and external system 14 for which an interface 10 is needed include JD Edwards, Oracle, Web-based apps, and legacy systems, all of which are known to those of skill in the art.

Each external system 12, 14 have system-specific data format and relational database management system methods designed into it. To move information from one external system to another, an interface 10 must be provided. Traditionally, such interfaces are custom designed and programmed. The work requires a large amount of expertise and knowledge about both external systems 12 and 14. Further, an interface 10 designed for any two specific external systems 12 and 14 will not function for any other pair of external systems. This results in very large expense to move data from one external system to another.

A need exists, therefore, for a method and system for providing an interface between external systems, such that the user of the external systems can configure an interface based solely on knowledge of the data in the external systems, without a need to have an in-depth understanding of the database model and communication protocols of each of the external systems.

SUMMARY OF THE INVENTION

Various objects of the invention are addressed in one aspect by an interface for communication with a first external system and a second external system, wherein a method is provided for responding to an event, the event being related to communication with at least one of the first or the second external systems, the method comprising:

receiving a message, the message comprising a metadata event key and a session identifier, the session identifier identifying a workset database for use with the message, the workset database having a workset database structure dependent upon metadata; and processing an action series dependent upon the metadata event key, wherein said processing is assigned to the session.

According to another aspect of the invention, there is provided an interface for communication with a first external system and a second external system, a method for responding to an event, the event being related to communication with at least one of the first or the second external systems, the interface comprising:

means for receiving a message, the message comprising a metadata event key and a session identifier, the session identifier identifying a workset database for use with the message, the workset database having a workset database structure dependent upon metadata; and means for processing an action series dependent upon the metadata event key, wherein the processing is assigned to the session.

According to still another aspect of the invention, there is provided a method for communicating data from a first external system to a second external system, the method comprising:

recognizing a message, comprising a event key and session identifier, the session identifier identifying a workset database for use with the message, the workset database having a workset database structure dependent upon metadata; and processing an action series dependent upon the metadata event key, wherein said processing is assigned to the session.

According to a further aspect of the invention, a system is provided for communicating data from a first external system to a second external system, the method comprising:

means for recognizing a message, comprising a event key and session identifier, the session identifier identifying a workset database for use with the message, the workset database having a workset database structure dependent upon metadata; and means for processing an action series dependent upon the metadata event key, wherein said processing is assigned to the session.

In even a further aspect a method is provided for selecting a group of records in a database wherein:

the database comprises a set of tables, at least some records in any particular table are in an ordered relationship with the other records in the table, at least one field in one of the tables consists of a join key field, the join key field being related to a field in another table, wherein a parent-child relationship between the tables is defined in which the table comprising the join key field is the child of the table comprising the field related to the join key field, at least some of the tables in the set of tables are related to at least one other table in the set of tables in a parent-child relationship, at least one of the records of the group carries a "current record" designation, wherein a current table is defined;

the method comprising:

designating one of the set of tables as a "reference table;"

designating one of the records of the reference table as a "reference record," the reference record comprising a field related to a join key field of a record of a descendant table of the reference table;

designating the group of records to comprise: the reference record and all records having a field related to the reference record; and designating a record in the reference table as the current record.

In yet another aspect, there is provided a system for selecting a group of records in a database wherein:

the database comprises a set of tables, at least some records in any particular table are in an ordered relationship with the other records in the table, at least one field in one of the tables consists of a join key field, the join key field being related to a field in another table, wherein a parent-child relationship between the tables is defined in which the table comprising the join key field is the child of the table comprising the field related to the join key field, at least some of the tables in the set of tables are related to at least one other table in the set of tables in a parent-child relationship, at least one of the records of the group carries a "current record" designation, wherein a current table is defined;

the system comprising:

means for designating one of the sets of tables as a "reference table;"

means for designating one of the records of the reference table as a "reference record," the reference record comprising a field related to a join key field of a record of a descendant table of the reference table;

means for designating the group of records to comprise: the reference record and all records having a field related to the reference record; and means for designating a record in the reference table as the current record.

In an even further aspect of the invention a method of querying a SAP system is provided, the method comprising:

reading a list of tables, wherein the list of tables is dependent upon user-defined metadata;

reading a list of fields, wherein the list of fields is dependent upon user-defined metadata;

reading a list of "where clauses", wherein the list of "where clauses" is dependent upon user-defined metadata;

building a message dependent upon said reading a list of tables, fields, and "where clauses", and upon data from a workset database; and sending the message to the "query" function module of SAP;

running the query function module, wherein the desired results of the query are provided to the message, wherein a modified message results; and receiving the modified message.

A system of querying a SAP system is also provided as an aspect of the invention, the system comprising:

means for reading a list of tables, wherein the list of tables is dependent upon user-defined metadata;

means for reading a list of fields, wherein the list of fields is dependent upon user-defined metadata;

means for reading a list of "where clauses", wherein the list of "where clauses" is dependent upon user-defined metadata;

means for building a message dependent upon said reading a list of tables, fields, and "where clauses", and upon data from a workset database; and means for sending the message to the "query" function module of SAP, wherein the message calls the query function module of SAP, wherein the desired results of the query are provided to the message, wherein a modified message results; and means for receiving the modified message.

An even further aspect is a method of performing a SAP transaction, the method comprising:

reading a list of screens, fields, and key-press codes, and a SAP transaction code;

building a message, dependent upon the list of screens, fields, and key-press codes, the message comprising BDC data, the screens, fields, and key-press codes being metadata-dependent;

sending the message to SAP "transaction" function module;

running the transaction function module, wherein a modified message results, the modified message including diagnostic codes; and receiving the modified message.

Further, a system of performing a SAP transaction is provided, the system comprising:

means for reading a list of screens, fields, and key-press codes, and a SAP transaction code;

means for building a message, dependent upon the list of screens, fields, and key-press codes, the message comprising BDC data, the screens, fields, and key-press codes being metadata-dependent;

means for sending the message to SAP "transaction" function module;

means for running the transaction function module, wherein a modified message results, the modified message including diagnostic codes; and means for receiving the modified message.

Even further still, a method for providing a user-defined interface is provided, the method comprising:

receiving a definition of a workset database dependent upon user-defined metadata;

receiving a map definition dependent upon user-defined metadata, the map being further dependent at least upon fields of the workset database;

receiving a definition of an action series for operating on fields of the workset database, the definition of the action series being dependent upon user-defined metadata; and receiving a definition of an event being associated with an action series and a map, the event being dependent upon user-defined metadata.

Still further, according to yet another aspect of the invention, a system for providing a user-defined interface, the system comprising:

means for receiving a definition of a workset database dependent upon user-defined metadata;

means for receiving a map definition dependent upon user-defined metadata, the map being further dependent at least upon fields of the workset database;

means for receiving a definition of an action series for operating on fields of the workset database, the definition of the action series being dependent upon user-defined metadata; and means for receiving a definition of an event being associated with an action series and a map, the event being dependent upon user-defined metadata.

BRIEF DESCRIPTION OF THE DRAWINGS

FIG. 1 is a block diagram of an embodiment of the present invention.

FIG. 2 is a block diagram of an embodiment of the present invention.

DESCRIPTION OF EXAMPLE EMBODIMENTS OF THE INVENTION

Figure 3:
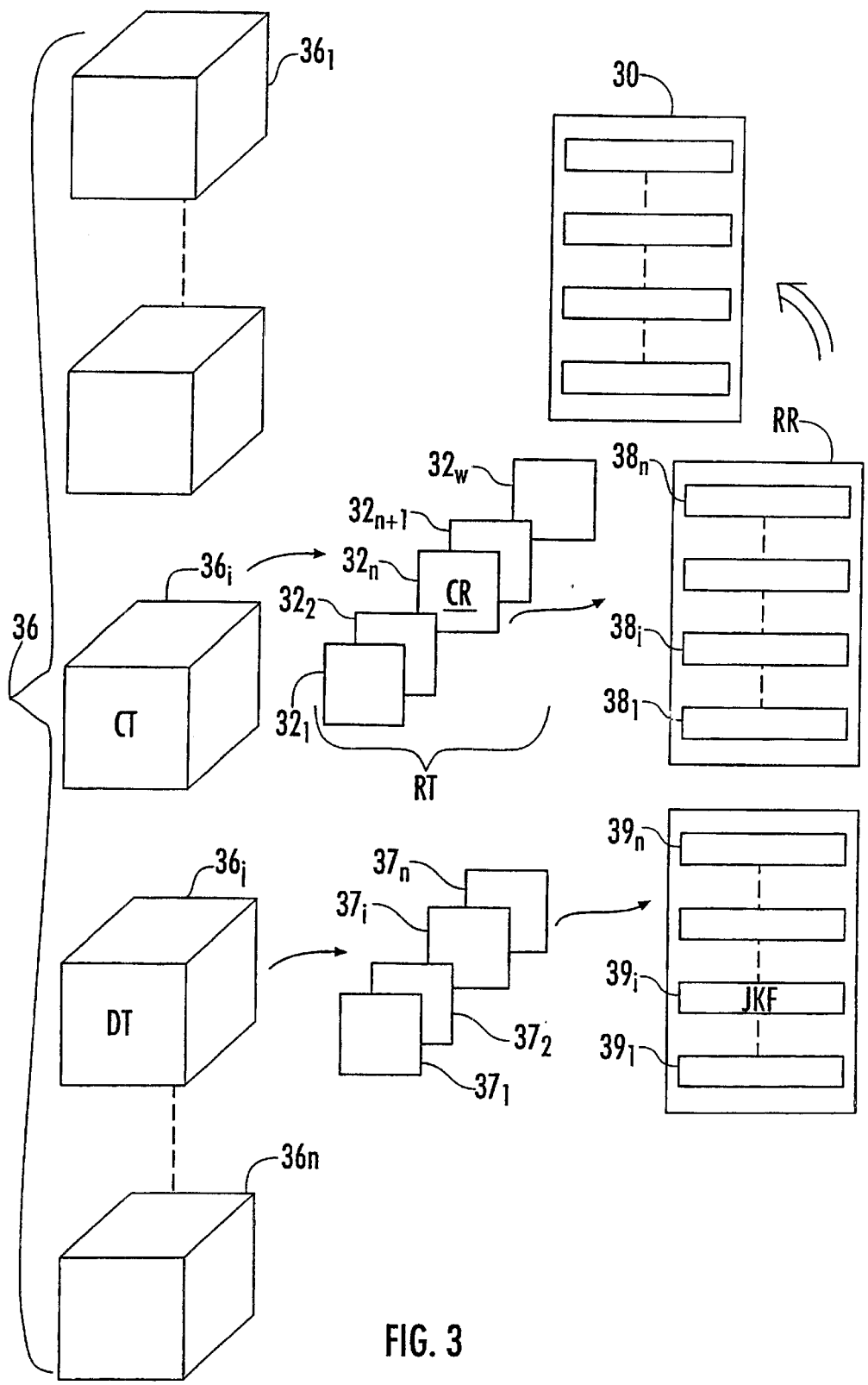
FIG. 3 is a block diagram of an embodiment of the present invention.

Referring now to FIG. 2, an aspect of the invention is seen. According to this aspect, as in FIG. 1, interface 10 is provided for communication with a first external system 12 and a second external system 14. As seen in FIG. 2, the interface 10 responds to an event 20 related to communication with at least one of the first or the second external systems 12 or 14, respectively. Here, the interface includes a means 80 for receiving a message 22, the message 22 comprising a metadata event key MTEK and a session identifier SI, the session identifier SI identifying a workset database WD for use with the message 22. The workset database WD has a workset database structure dependent upon metadata 82. Also included in interface 10 is a means 84 for processing an action series, here, an Action Series Processor (ASP), dependent upon the metadata event key MTEK, wherein the processing is assigned to the session identified by SI. In some embodiments of the invention, workset database structure metadata 82 comes from a relational database management system database, while in other embodiments, the workset metadata 82 comes from other databases. Message sender 80' sends a message 22' to external system 12 or 14, wherein message 22' comprises data and external system information needed by the external system 12 or 14 for using the data.

Referring now to FIG. 3, an example embodiment is seen in which the processing seen in FIG. 2 is dependent upon a method for selecting a group 30 of records in a database 36. In the illustrated example, the database 36 is located in the interface 10 of FIG. 1 and comprises a set of tables $36_1$–$36_n$. At least some records $32_1$–$32_n$ in any particular table $36_i$ are in an ordered relationship with the other records $32_{n+1}$–$32_w$ in the table $36_i$. Further, at least one of the fields $39_1$–$39_n$ in one of the tables $37_i$ consists essentially of a join key field JKF $39_i$. The join key field JKF is related to a field $38_i$ in another record of another table 36, wherein a parent-child relationship between the tables $36_i$ and $36_j$ is defined. Here, the table $36_i$ including the field $38_i$ related to the join key field JKF 39 is the parent of the table $36_j$ including the join key field JKF. In various embodiments of the invention, at least some of the tables $36_1$–$36_n$ in the set of tables 36 are related to at least one other table in the set of tables in a parent-child relationship. Such relations are known to those of skill in the art. For example, in a purchasing system, a purchase order header table may be related to a purchase order line item table.

Referring still to the example of FIG. 3, at least one of the records $32_n$ carries a "current record" CR designation, wherein a current table CT (table $36_i$ in the example) is defined.

One example method useful with the FIG. 3 example comprises designating one of the set of tables as a "reference table" RT (in this example, the current table CT is designated); designating one of the records of the reference table RT as a "reference record" RR, the reference record RR comprising a field $38_i$, which is related to a join key field JKF ($39_j$) of a record $37_i$ of a descendant table DT ($36_j$) of the reference table RT. The group of records 30 (FIG. 3) is designated to comprise the reference record RR and all records having a field related to the reference record.

Figure 4:
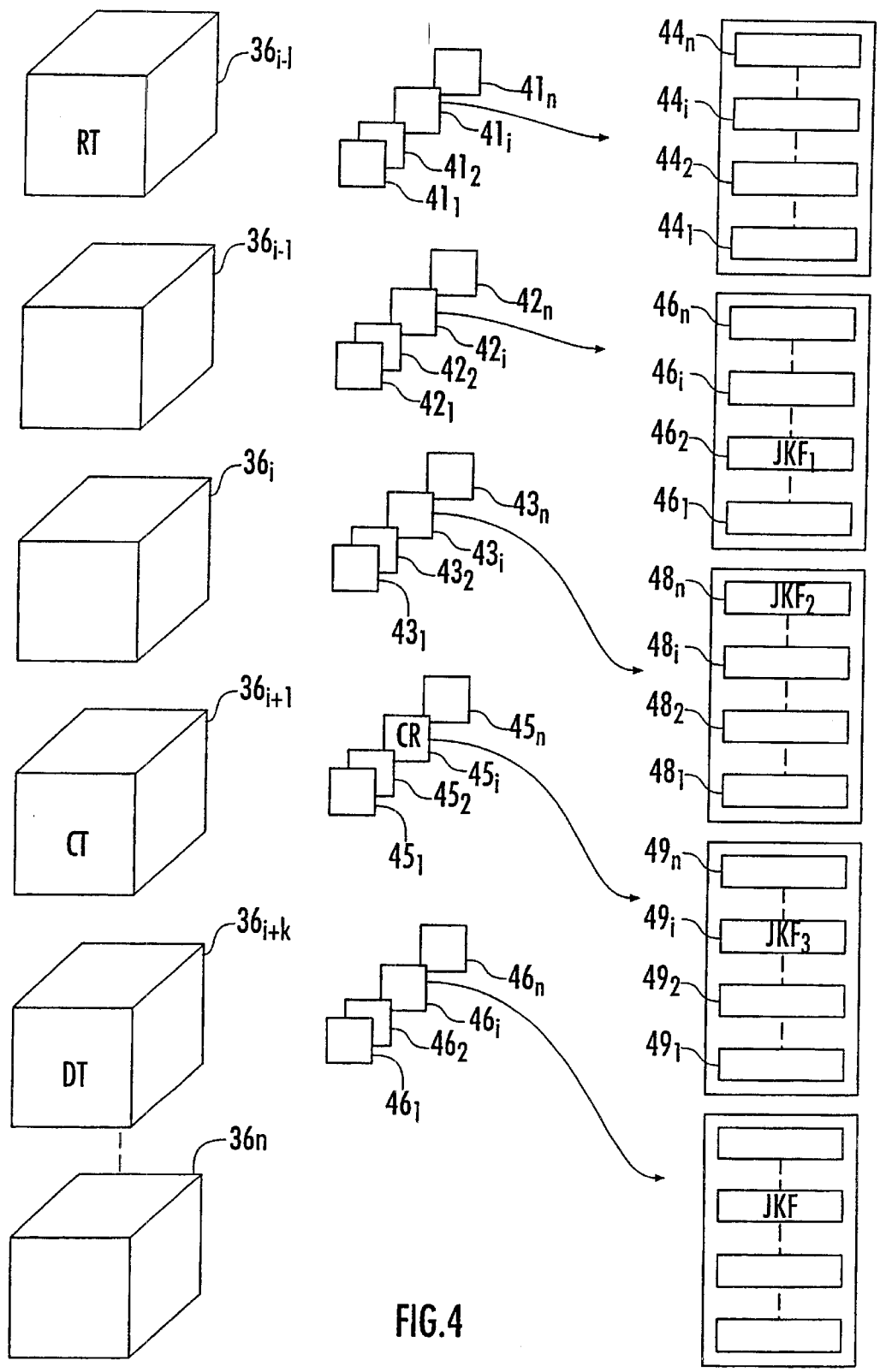
FIG. 4 is a block diagram of an embodiment of the present invention.

Referring now to FIG. 4, an alternative example embodiment is seen in which the reference table RT consists of an ancestor of the current table CT. According to still a further and more specific example embodiment of the invention, a record $41_i$ of the reference table RT includes a field $44_i$ related to a join key field JKF of a descendant table DT of the reference table RT. This relation occurs through a descendant line of records $41_i$, $42_i$, $43_i$, $45_i$, wherein each of the records $42_i$, $43_i$, and $45_i$ in the descendant line includes a field $44_i$, $46_i$, $48_i$, $49_i$, related to a join key field JKF1–JKF3, located in a further descendant record, respectively. The step of designating the group of records 30 (FIG. 3) comprises designating the group of records 30 to further include the descendant line of records $42_i$, $43_i$, and $45_i$. Note that, in some cases, the JKF field consists of the field subsequently linked to a descendant join key field, while in other cases, the join key field in a particular record and the field linked to a join key field in another record are not the same field.

In still another alternative embodiment of the invention (not shown), the reference table is a descendant of at least one ancestor table of the reference table, and each of the ancestors of the reference table include a record having a field related to a join key field in a record located in a child of the ancestor of the reference table. In such cases, an ancestral line of records of the reference table is defined. The designating of the group of records then further comprises designating the group of records to further include the ancestral line of records. According to yet other more specific embodiments of the invention, an additional step of recording the group in a stack of groups is provided. Such recording is understood by those of skill in the art.

In even further embodiments of the invention, the action series mentioned above comprises actions that create data in the workset database WD (FIG. 2). Such actions will be understood by those of ordinary skill in the art upon review of the current specification and require no further explanation. Alternatively, the action series comprises actions that modify data in the workset database, or the action series comprises actions that change the environment of the data in the workset database. For example, add or delete groups, add or modify variables, sort or filter records. Again, such actions will occur to those of ordinary skill in the art and require no further explanation.

Figure 5:
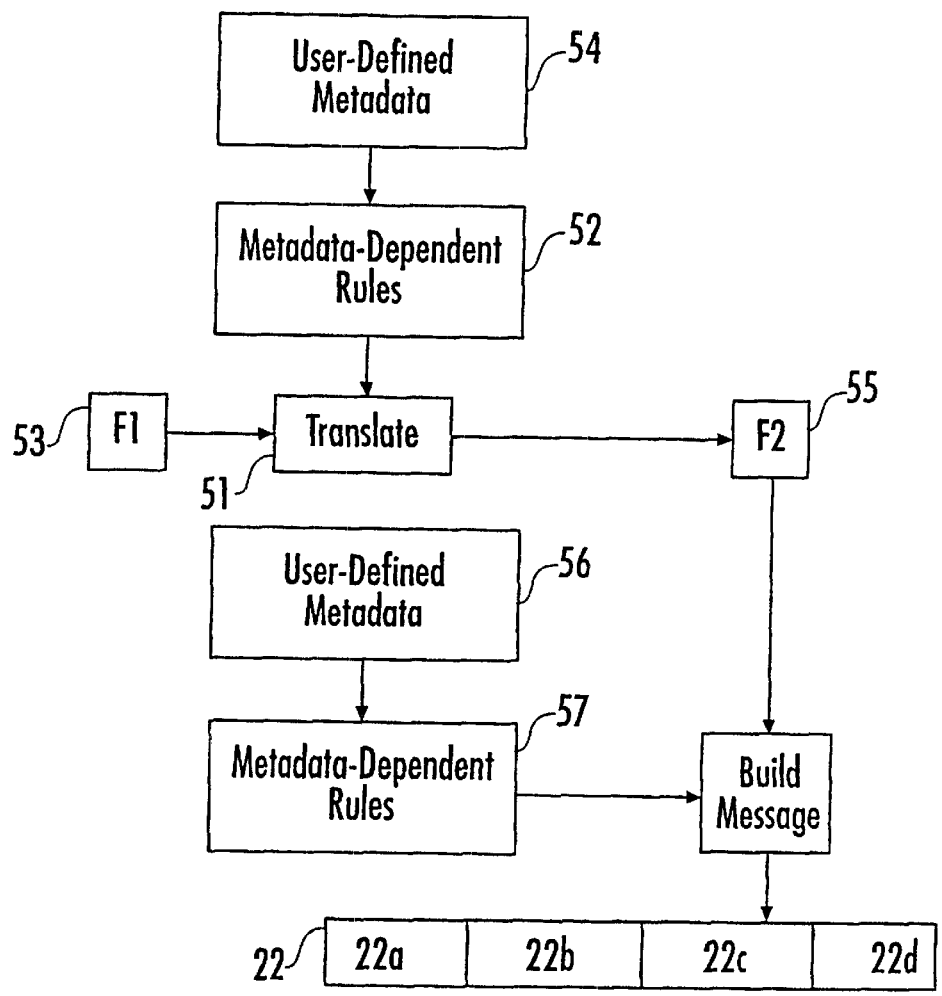
FIG. 5 is a block diagram of an embodiment of the present invention.

In yet another alternative, the action series comprises actions that send data to an external system 12 or 14 (FIG. 1). In some examples of such an alternative, illustrated in FIG. 5, the actions that send data to an external system comprise translating data from a first format F1 to a second format F2 and building a message 22 in format F2 to send to the external system. In some examples of the FIG. 5 embodiment, the translating of data is dependent upon a set of rules 52 which are dependent upon a set of user-defined metadata 54. In the illustrated example, the building of a message 22 is dependent upon a set of rules 57 which are dependent upon a set of user-defined metadata 56. In some embodiments, the message components 22a, 22b, 22c, and 22d consist of text, numbers, and binary data, as are known to those of skill in the art. In some embodiments, the message is translated before being built, while in other embodiments, no translating is performed.

Figure 6:
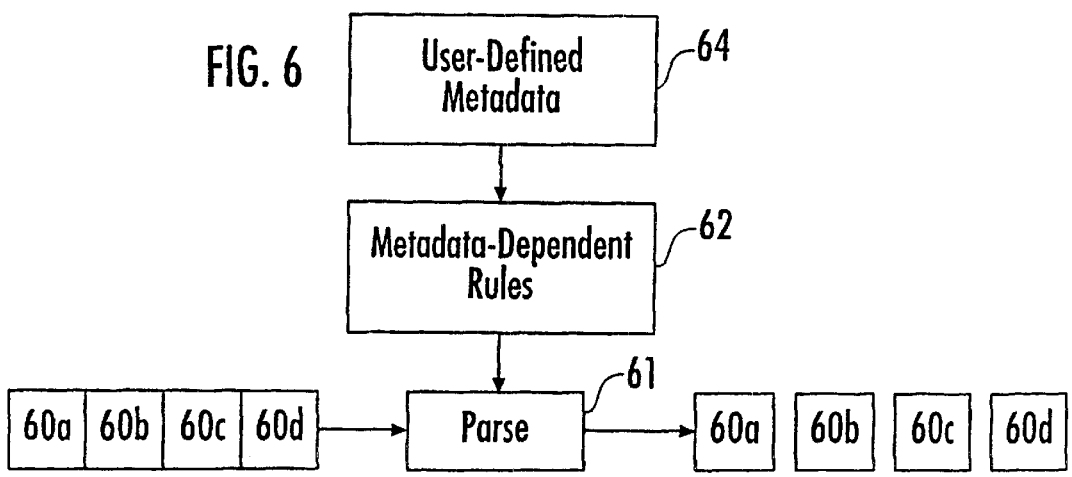
FIG. 6 is a block diagram of an embodiment of the present invention.

Referring now to FIG. 6, in still another example embodiment, the action series comprises actions that retrieve data from an external system 12 or 14. In one such embodiment, the actions that retrieve data from an external system comprise parsing an unparsed message 60, which comprises components 60a, 60b, 60c, and 60d (for example, headers, data, delimeters, and trailers) received from the external system into a parsed message having at least some but not necessarily all of components 60a–60d. Further, the action series comprises translating data from a first format to a second format as described in reference to FIG. 5. As seen in FIG. 6, the parsing is dependent upon a set of rules 62 which are dependent upon a set of user-defined metadata 64.

In some examples of the above embodiments, the workset database WD is memory resident. In other example embodiments, the workset database resides in a disk-based application such as SQL Server.

Figure 7:
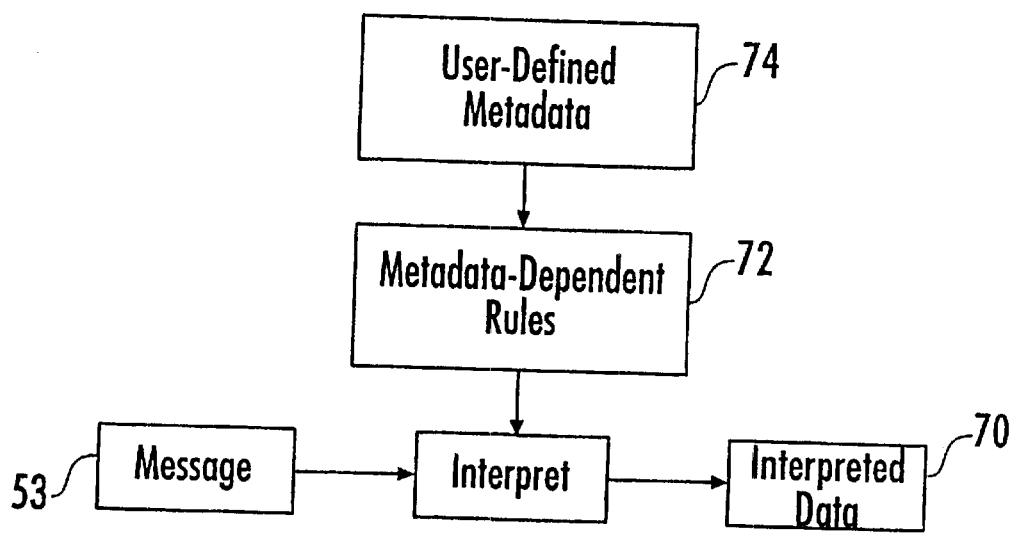
FIG. 7 is a block diagram of an embodiment of the present invention.

Referring again to FIG. 2, a further embodiment of the invention comprises receiving a first set of data from the first external system 12 with the message 22; interpreting the first set of data, using the message receiver 80 of interface 10. Referring now to FIG. 7, a first interpreted set of data 70 results. The interpreted set of data 70 is stored in the workset database WD (FIG. 2). In the specific example of FIG. 7, the interpreting is dependent upon a first set of rules 72, the first set of rules being dependent upon a first set of user-defined metadata 74, and the user-defined metadata are dependent upon the data structure of the external system 12 (FIG. 1) from which message 22 (FIG. 2) containing data originates. Metadata dependent rules 72 are generated, in one embodiment, from an Relational database management system database populated by user input, which is then processed into metadata and stored in memory. In an even more specific example embodiment, the interpreting the first set of data comprises parsing and translating, as described above with respect to FIGS. 5 and 6.

Referring again to FIG. 2, the illustrated example shows receipt of only a single message 22. In alternative embodiments, however, the method further comprises receiving a second message from the first external system; receiving a second set of data from the first external system with the second message; interpreting the second set of data, whereby a second set of interpreted data results; and storing the second set of interpreted data in the workset database. As will be understood by those of ordinary skill in the art, multiple messages are processed according to the above steps resulting in combined interpreted data in the workset database. In still further embodiments (now shown) multiple messages are received from multiple external systems and processed as described below.

Figure 8:
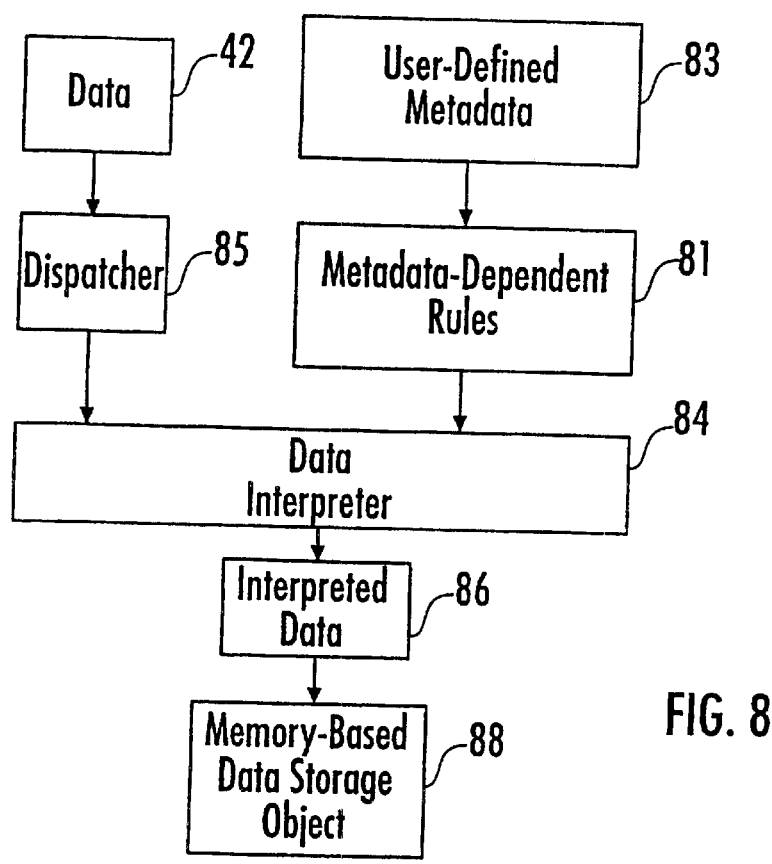
FIG. 8 is a block diagram of an embodiment of the present invention.

FIG. 8 illustrates an even further example of the current aspect of the invention. Here, the interface 10 further comprises: means 85 for receiving a first set of data 42 from the first external system 12 with the message (here, a dispatcher, such as are known to those of skill in the art); means 84 for interpreting the first set of data 42 (here an interpreter, which performs the steps and includes the objects of FIG. 5 and 6), whereby a first interpreted set of data 86 results; and means 88 for storing the first interpreted set of data 86 in storage in the workset database WD (here, a memory based data storage object as will be understood by those of skill in the art with reference to FIGS. 3 and 4). The interpreter is dependent upon a first set of rules 81, and the first set of rules are dependent upon a first set of user defined metadata 83, the user defined metadata 83 being dependent upon the data structure of the external system. In one such system, as seen in FIG. 6, the interpreter 84 includes a means 61 for parsing the first set of data 60 (here, a parser, as known to those of skill in the art). A set of parsed data 60a–60d results, and the interpreted set of data comprises the set of parsed data. In another such system, seen in FIG. 5, the means for interpreting the first set of data comprises a means 51 for translating the first set of data 53 (here, a translator, as known to those of skill in the art), wherein a set of translated data 55 results. The interpreted set of data comprises the set of translated data. In many example embodiments, the parsing is performed before translating the parsed data 60a–60d, which is in a first format F1, into a second format F2. In such an embodiment, the interpreted set of data comprises the set of parsed and translated data.

Figure 9:
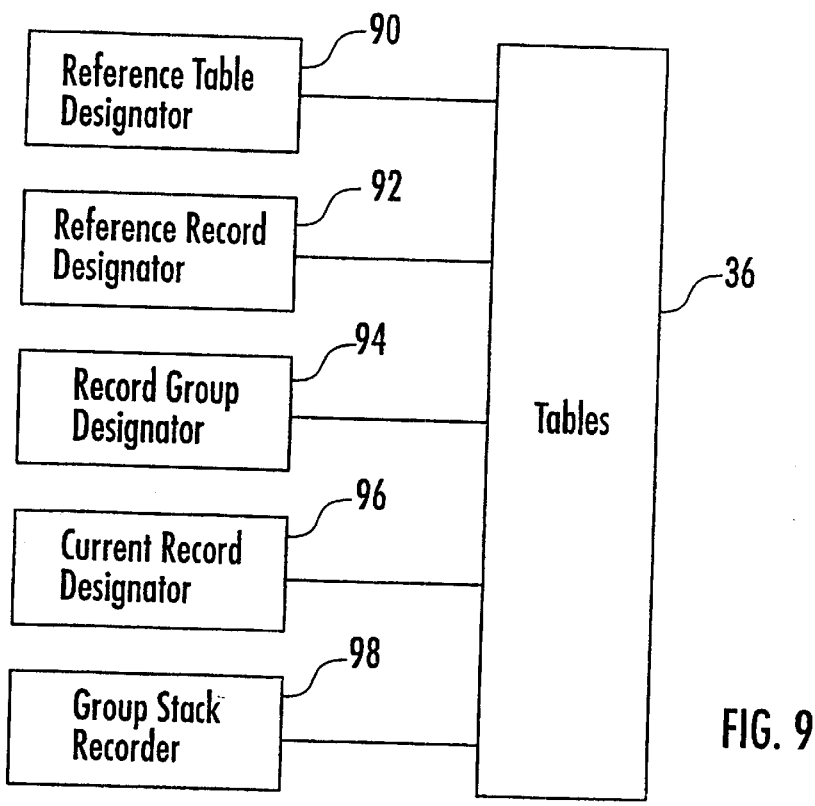
FIG. 9 is a block diagram of an embodiment of the present invention.

Referring now to FIG. 9, another aspect of the invention is seen. Here, a system for forming the group of records discussed with regard to FIGS. 3 and 4 is seen. In this example, the system comprises: means 90 for designating one of the set of tables as a "reference table;" means 92 for designating one of the records of the reference table as a "reference record," the reference record comprising a field related to a join key field of a record of a descendant table of the reference table; means 94 for designating the group of records to comprise: the reference record and all records having a field related to the reference record; and means 96 for designating a record in the reference table as the current record. A means 98 for recording the group in a stack of groups is provided. In the illustrated example embodiment, the means 90 consists essentially of a reference table designator. A particularly useful reference table designator consists essentially of a unique integer, as is known to those of skill in the art. Other reference table designators useful according to the invention will occur to those of skill in the art without further reference.

Also, means 92 consists essentially of a reference record designator. A particularly useful reference record designator consists essentially of a unique integer, as is known to those of skill in the art. Other useful reference record designators will occur to those of skill in the art.

Likewise, means 94, means 96, and means 98 consist essentially of a record group designator, a current record designator, and a group stack designator, respectively. Particularly useful such designators include, for example unique integers. Other such designators will occur to those of skill in the art.

Figure 10:
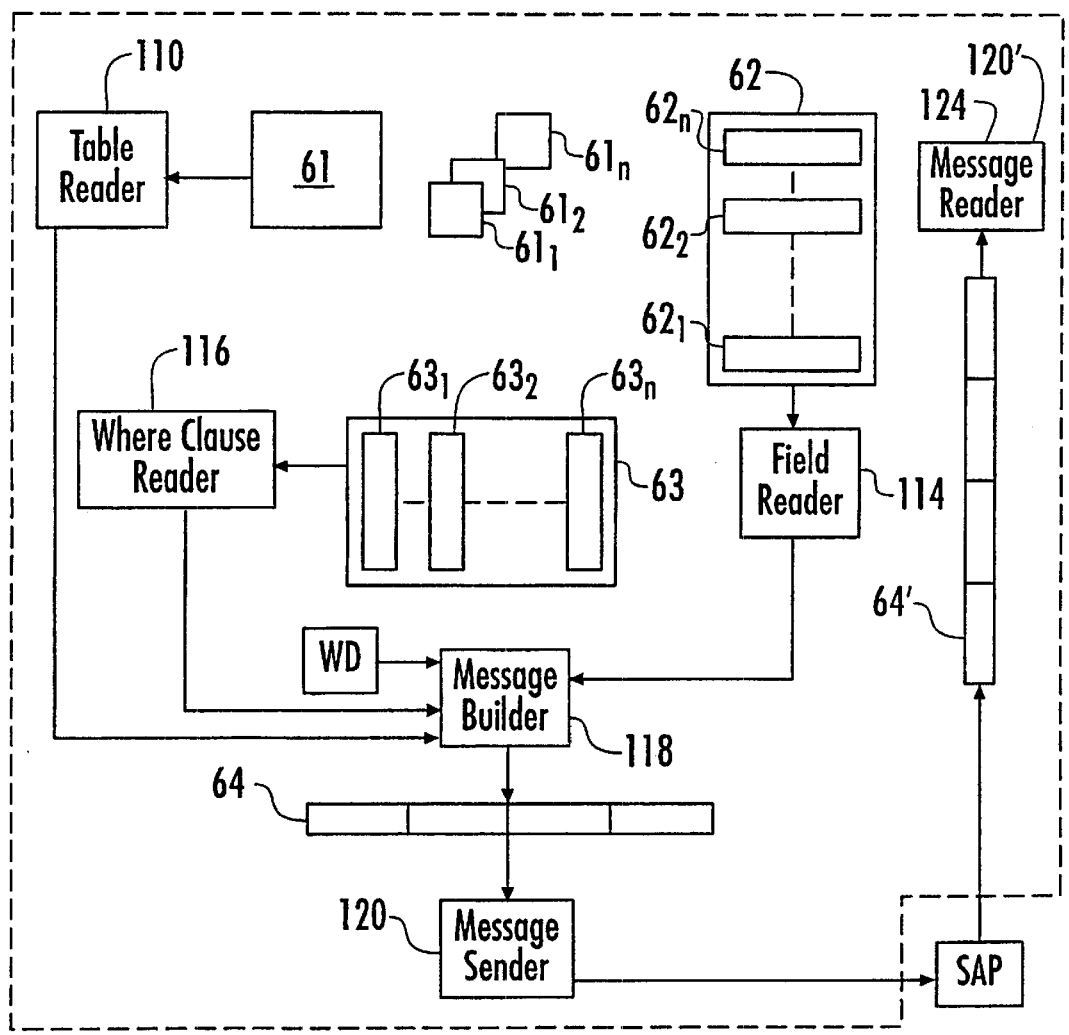

Referring now to FIG. 10, according to an even further aspect of the present invention, the interface 10 of FIG. 1 comprises a system and method of querying a SAP system. The system comprising: means 110 for reading a list 61 of tables $61_1$–$61_n$, wherein the list 61 of tables $61_1$–$61_n$ is dependent upon user-defined metadata; means 114 for reading a list 62 of fields $62_1$–$62_n$, wherein the list 62 of fields $62_1$–$62_n$ is dependent upon user-defined metadata; means 116 for reading a list 63 of "where clauses" $63_1$–$63_n$, wherein the list 63 of "where clauses" $63_1$–$63_n$ is dependent upon user-defined metadata; means 118 for building a message 64 dependent upon said reading the lists of tables 61, fields 62, and "where clauses" 63, and upon data from a workset database WD; means 120 for sending the message to the "query" function module Q of SAP; SAP then runs query function module Q, wherein the desired results of the query are provided to the message 64, wherein a modified message 64' results; and means 124 for receiving the modified message 64'.

In the illustrated example, means 110 consists essentially of few lines of code for retrieving stored metadata, as will be understood by those of skill in the art. Further the illustrated means 114 consists essentially of a field reader, again, code, as will be understood by those of skill in the art. Further still, the illustrated means 116 consists essentially of a where clause reader (again, for example, code). Also seen in the illustrated example, means 118 comprises a message builder. As explained with reference to FIG. 5, above other acceptable builders will occur to those of skill in the art. Even further, in the illustrated example, the means 120 consists essentially of a message sender as explained, for example, with respect to FIG. 5. Again, other acceptable senders will occur to those of skill in the art. Finally, means 124, in the illustrated example, consists essentially of a message reader 120'. In one acceptable example, message reader 120' consists essentially of a function in sender 120, which waits on a response from SAP, and then translates, and passes the response as described above. Other acceptable examples will occur to those of skill in the art.

Figure 11:
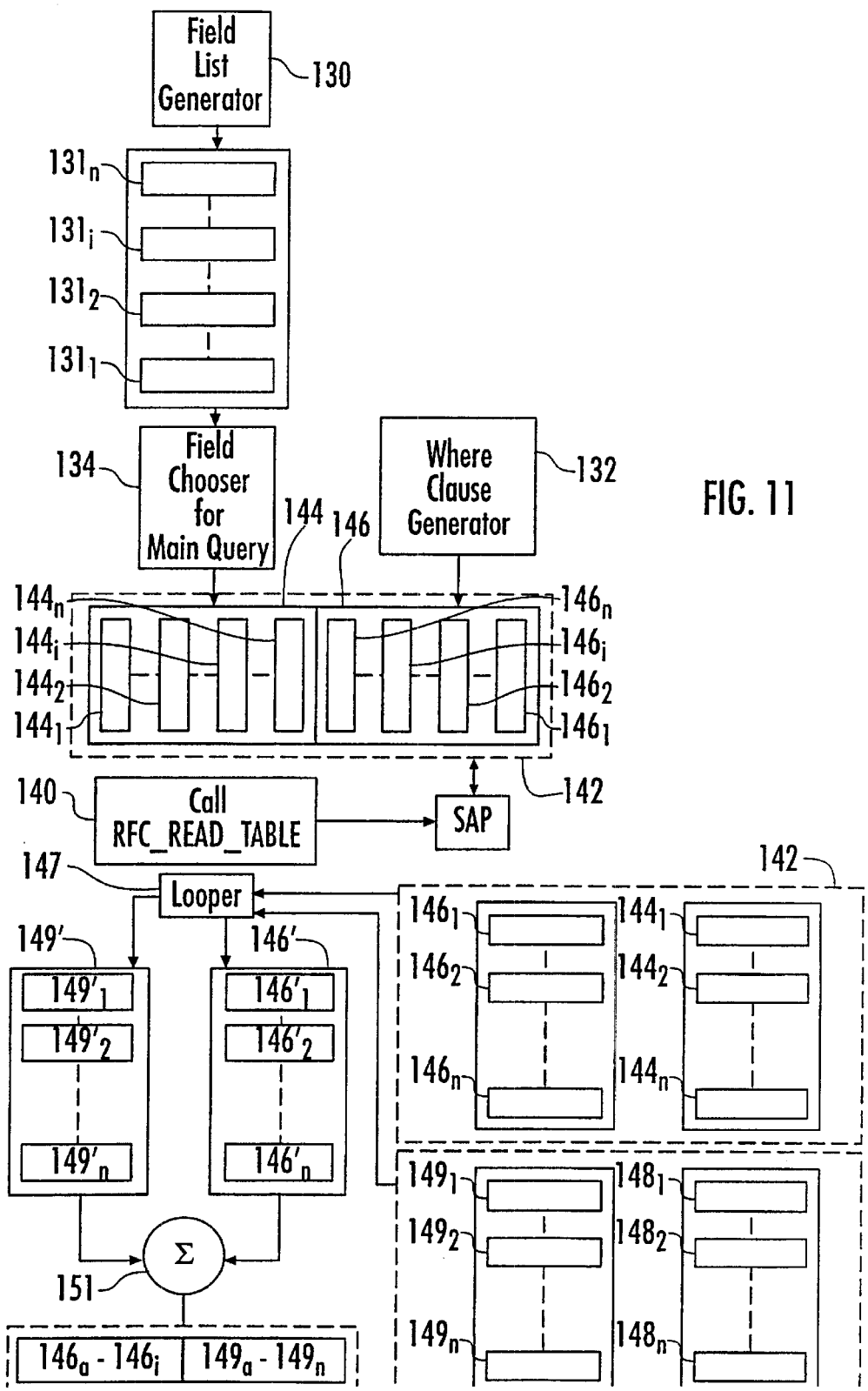

According to another specific example, as seen in FIG. 11, the SAP query function module comprises: means 130 for creating a list 131 of fields $131_1$–$131_n$ to gather; means 132 for building where clauses for a main query; means 134 for determining fields to gather in main query, wherein the fields in the main query comprise a subset of the list 131 of fields $131_1$–$131_n$; means 140 for performing the main query by calling the RFC_READ_TABLE function of SAP; means 142 for receiving a first table 144 as a result of the RFC_READ_TABLE function describing the fields $144_1$–$144_n$ in the results table 144 of the main query and a second table 146 as a result of the RFC_READ_TABLE function wherein the second table 146 includes the results $146_1$–$146_n$ of the main query; means 147 for looping through the second table to parse out fields 146a–146i in the list 146 of fields 146i–146n, wherein a set 146' of parsed result fields is defined.

According to a still more specific example, the means 140 for performing the query function and the means 142 for receiving repeat, resulting in a third table 147 and a fourth table 149. The system then loops through the fourth table 149 to parse out fields $149_a$–$149_i$ in the list of fields $149_i$–$149_n$ of the fourth table 149, and means 151 for adding the list 149' of fields 149a–149n of the fourth table to the set of parsed result fields 146'.

In the illustrated example, means 130 consists essentially of a field list generator, an acceptable one of which consists essentially of a module which reads a list of table and field names passed in to the function module, as is known to those of skill in the art. Other acceptable generators will also occur to those of skill in the art. Further in the illustrated example, means 132 consists essentially of a where clause generator, an acceptable one of which consists essentially of a module which reads a list of partially formatted where clauses passed in to the function module, selects the appropriate where clauses based on a table name designator field, and completes the where clauses when prompted by the presence of a substitution string, as is known to those of skill in the art. Other acceptable such generators will also occur to those of skill in the art. Further still in the illustrated example, means 134 consists essentially of a main query field chooser, an acceptable one of which consists essentially of a module which reads the list of fields 131 and extracts those fields designated for use with the main query table as indicated in the table field of the list record, as is known to those of skill in the art. Other acceptable such choosers will also occur to those of skill in the art. Even further, still in the illustrated example, means 140 consists essentially of an RFC_READ_TABLE call module, an acceptable one of which consists essentially of a the function supplied by SAP, as is known to those of skill in the art. Other acceptable such call modules will also occur to those of skill in the art. Still further in the illustrated example, means 148 consists essentially of a looper, an acceptable one of which consists essentially of a "do-while" loop, as is known to those of skill in the art. Other acceptable such loopers will also occur to those of skill in the art. Finally in the illustrated example, means 150 consists essentially of a summer, an acceptable one of which consists essentially of a concatenates subsequently selected fields into a single internal table, as is known to those of skill in the art. Other acceptable such summers will also occur to those of skill in the art.

Figure 12:
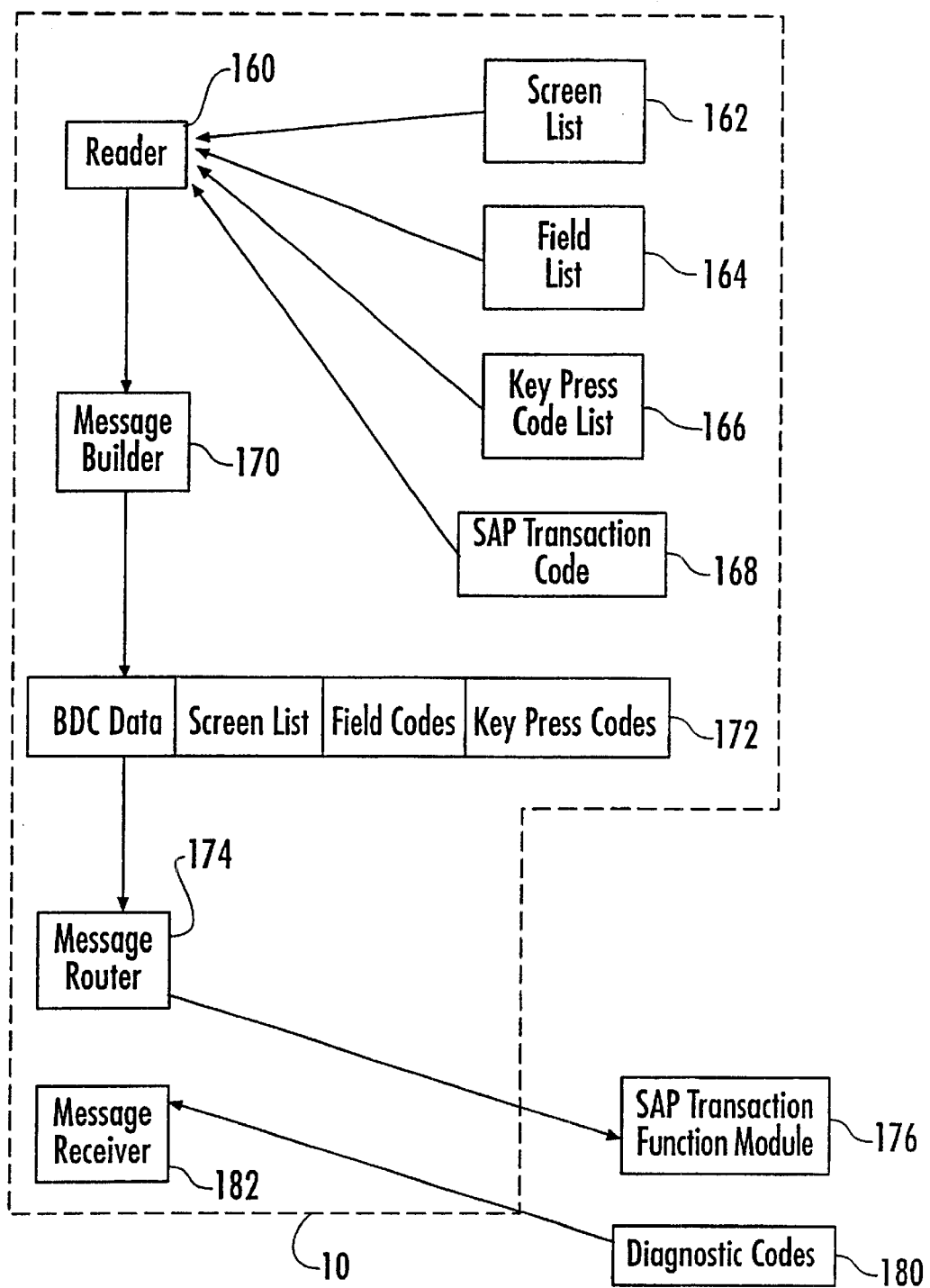

Referring now to FIG. 12, according to still a further aspect of the present invention, a method and system of performing a SAP transaction are provided, the system 10 comprising: means 160 for reading a list of screens 162, fields 164, and key-press codes 166, and a SAP transaction code 168; means 170 for building a message 172, dependent upon the list of screens, fields, and key-press codes, the message comprising BDC data, the screens, fields, and key-press codes, all being metadata-dependent. The system further comprises means 174 for sending the message 172 to SAP "transaction" function module 176, which runs the transaction function module 176, wherein a modified message 180 results, the modified message including diagnostic codes; and means 182 for receiving the modified message. Acceptable means 160 and 170 comprise readers and builders as described above.

Further, means 174 consist essentially of a message router as seen in FIG. 2 as message sender 80'. Also, means 182 consists essentially of a message receiver. One acceptable such receiver is seen in FIG. 2 (80).

Figure 13:
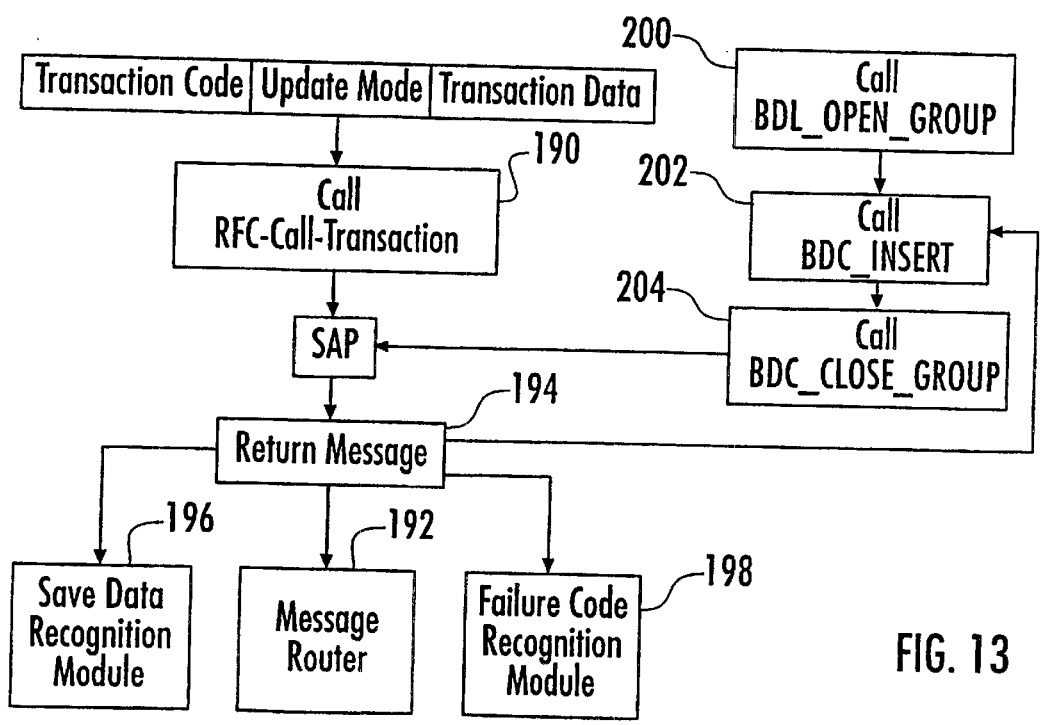
FIG. 10–14 is a block diagram of an embodiment of the present invention.

In one further example of such a system 10, seen in FIG. 13 said transaction function module 176 comprises (as seen in FIG. 13): means 190 for calling the RFC_CALL_TRANSACTION function of SAP with a transaction code, an update mode, and transaction data in BDCDATA format; and means 192 for receiving a return message 194. Function module 176 further comprises means 196 for recognizing a message to save a data session in SAP; and means 198 for checking the return message for a failure code. In one example embodiment, means 190 consists essentially of a CALL TRANSACTION ABAP Command, as is known to those of skill in the art. Other acceptable means will occur to those of skill in the art. Further, means 192 consists essentially of including a passed in parameter to determine whether to save a session on failure, as is known to those of skill in the art. Other acceptable means will occur to those of skill in the art. Still further, means 196 consists essentially of a save date recognition module, as is known to those of skill in the art, and, again, other acceptable means will occur to those of skill in the art. Also, means 198 consists essentially of a checking the messages returned by the CALL TRANSACTION and checking SY-SUBRC, as is known to those of skill in the art. Other acceptable means will occur to those of skill in the art.

In an even more specific example embodiment, the failure code designates a failure of the CALL TRANSACTION statement, and the module 176 ABAP function further comprises: means 200 for calling the BDC_OPEN_GROUP function of SAP; means 202 for calling the BDC_INSERT function of SAP using a transaction code and a set of transaction data of the failed calling of the CALL TRANSACTION; and means 204 for calling the BDC_CLOSE_GROUP function of SAP; wherein a stored session in SAP results.

In still another embodiment, means 200, 202, and 204 consist essentially of call function modules as are known to those of skill in the art.

Figure 14:
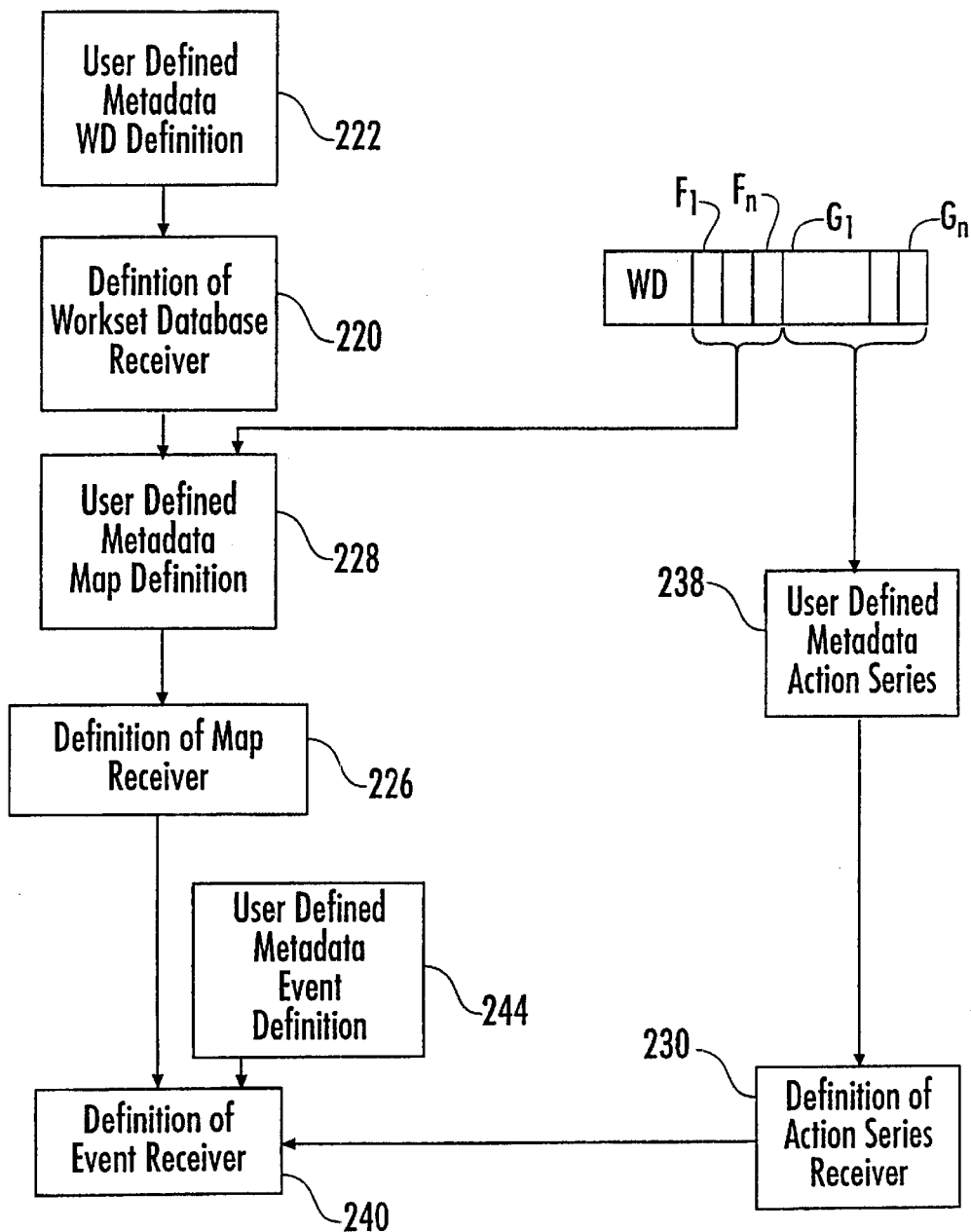

Referring now to FIG. 14, according to still another aspect of the present invention, a system and method is provided for providing a user-defined interface 10, the system comprising: means 220 for receiving a definition 222 of a workset database WD dependent upon user-defined metadata; means 226 for receiving a map definition 228 dependent upon user-defined metadata. The map definition is further dependent at least upon fields $F_1$–$F_n$ of the workset database WD. Also provided are means 230 for receiving a definition 238 of an action series for operating on fields $G_1$–$G_n$ of the workset database, the definition 238 of the action series being dependent upon user-defined metadata; and means 240 for receiving a definition 244 of an event being associated with the action series and the map, the event being dependent upon user-defined metadata. According to a more specific embodiment of the current aspect, the means 220, 226, 230, and 240, for receiving, consist essentially of software objects designed for reading the data from a relational database management system and for storing the data in memory, as are known to those of skill in the art. They are further dependent upon fields of an external system.

The above embodiments are given by way of example only. Other embodiments and modifications of the listed examples will occur to those of ordinary skill in the art without departing from the spirit of the invention.

What is claimed is:

1. A method of querying a SAP system, the method comprising:
    reading a list of tables, wherein the list of tables is dependent upon user-defined metadata;
    reading a list of fields, wherein the list of fields is dependent upon user-defined metadata;
    reading a list of "where clauses", wherein the list of "where clauses" is dependent upon user-defined metadata;
    building a message dependent upon said reading a list of tables, fields, and "where clauses", and upon data from a workset database; and
    sending a message to the "query" function module of SAP;
    running the query function module, wherein the desired results of the query are provided to the message, wherein a modified message results; and
    receiving the modified message.

2. A method as in claim 1 wherein said query function module comprises:
    creating a list of fields to gather;
    building where clauses for a main query;
    determining fields to gather in main query, wherein the fields to gather in the main query comprise a subset of the list of fields to gather;
    performing the main query by calling the RFC_READ_TABLE function of SAP;
    receiving, a first table as a result of the RFC_READ_TABLE function describing the fields in the results of the main query and a second table as a result of the RFC_READ_TABLE function wherein the second table includes the results of the main query;
    looping through the second table to parse out fields in the list of fields, wherein a set of parsed result fields is defined.

3. A method as in claim 2 wherein said performing step and said receiving step are repeated, resulting in a third table and a fourth table and further comprising:
    looping through the fourth table to parse out the fields in the list of fields of the fourth table, and
    adding the list of fields of the fourth table to the set of parsed result fields.

4. A method as in claim 3 wherein said preparing secondary where clauses is dependant upon results from a previous query.

5. A method as in claim 3 wherein said preparing secondary where clauses is dependant upon SY fields.

6. A system of querying a SAP system, the system comprising:
    means for reading a list of tables, wherein the list of tables is dependent upon user-defined metadata;
    means for reading a list of fields, wherein the list of fields is dependent upon user-defined metadata;
    means for reading a list of "where clauses", wherein the list of "where clauses" is dependent upon user-defined metadata;
    means for building a message dependent upon said reading a list of tables, fields, and "where clauses", and upon data from a workset database; and
    means for sending the message to a "query" function module of SAP, wherein the message calls the query function module of SAP,
    wherein the desired results of the query are provided to the message, wherein a modified message results; and
    means for receiving the modified message.

7. A system as in claim 6 wherein said query function module comprises:
    means for creating a list of fields to gather;
    means for building where clauses for a main query;
    means for determining fields to gather in main query, wherein the fields to gather in the main query comprise a subset of the list of fields to gather;
    means for performing the main query by calling the RFC_READ_TABLE function of SAP;
    means for receiving a first table as a result of the RFC_READ_TABLE function describing the fields in the results of the main query and a second table as a result of the RFC_READ_TABLE function wherein the second table includes the results of the main query;
    means for looping through the second table to parse out fields in the list of fields, wherein a set of parsed result fields is defined.

8. A system as in claim 7 wherein said means for performing and said means for receiving repeat repeated, resulting in a third table and a fourth table and further comprising:
    means for looping through the fourth table to parse out the fields in the list of fields of the fourth table, and
    means for adding the list of fields of the fourth table to the set of parsed result fields.

9. A system as in claim 8 wherein said means for preparing secondary where clauses is dependant upon results from a previous query.

10. A system as in claim 8 wherein said means for preparing secondary where clauses is dependant upon SY fields.

11. A method of performing a SAP transaction, the method comprising:
    reading a list of screens, fields, and key-press codes, and a SAP transaction code;
    building a message, dependant upon the list of screens, fields, and key-press codes, the message comprising BDC data, the screens, fields, and key-press codes being metadata-dependant;

sending the message to SAP "transaction" function module;

running the transaction function module, wherein a modified message results, the modified message including diagnostic codes; and receiving the modified message.

12. A method as in claim 11 wherein said transaction function module comprises:

calling the RFC_CALL_TRANSACTION function of SAP with a transaction code, and update mode, and transaction data in BDCDATA format;

receiving a return message.

13. A method as in claim 12 further comprising:

recognizing a message to save a data session in SAP; and checking the return message for a failure code.

14. A method as in claim 13 wherein said failure code designates a failure of the RFC_CALL_TRANSACTION function, the method further comprising:

calling the BDC_OPEN_GROUP function of SAP;

calling the BDC_INSERT function of SAP using uses a transaction code and a set of transaction data of the failed calling of the RFC_CALL_TRANSACTION; and calling the BDC_CLOSE_GROUP function of SAP;

wherein a stored session in SAP results.

15. A system of performing a SAP transaction, the system comprising:

means for reading a list of screens, fields, and key-press codes, and a SAP transaction code;

means for building a message, dependant upon the list of screens, fields, and key-press codes, the message comprising BDC data, the screens, fields, and key-press codes being metadata-dependant;

means for sending the message to SAP "transaction" function module;

means for running the transaction function module, wherein a modified message results, the modified message including diagnostic codes; and means for receiving the modified message.

16. A system as in claim 15 wherein said transaction function module comprises:

means for calling the RFC_CALL_TRANSACTION function of SAP with a transaction code, and update mode, and transaction data in BDCDATA format;

means for receiving a return message.

17. A system as in claim 16 further comprising:

means for recognizing a message to save a data session in SAP; and means for checking the return message for a failure code.

18. A system as in claim 17 wherein said failure code designates a failure of the RFC_CALL_TRANSACTION function, the system further comprising:

means for calling the BDC_OPEN_GROUP function of SAP;

means for calling the BDC_INSERT function of SAP using uses a transaction code and a set of transaction data of the failed calling of the RFC_CALL_TRANSACTION; and means for calling the BDC_CLOSE_GROUP function of SAP;

wherein a stored session in SAP results.

\* \* \* \* \*